(12) United States Patent
Ovsiannikov et al.

(10) Patent No.: US 11,775,256 B2
(45) Date of Patent: Oct. 3, 2023

(54) SIGNED MULTIPLICATION USING UNSIGNED MULTIPLIER WITH DYNAMIC FINE-GRAINED OPERAND ISOLATION

(71) Applicant: Samsung Electronics Co., Ltd., Suwon-si (KR)

(72) Inventors: Ilia Ovsiannikov, Porter Ranch, CA (US); Ali Shafiee Ardestani, San Jose, CA (US); Joseph H. Hassoun, Los Gatos, CA (US); Lei Wang, Burlingame, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 18/096,559

(22) Filed: Jan. 12, 2023

(65) Prior Publication Data
US 2023/0153065 A1    May 18, 2023

Related U.S. Application Data

(63) Continuation of application No. 17/151,115, filed on Jan. 15, 2021, now Pat. No. 11,579,842, which is a
(Continued)

(51) Int. Cl.
*G06F 7/487* (2006.01)
*G06F 7/523* (2006.01)
*G06F 9/30* (2018.01)

(52) U.S. Cl.
CPC ............ *G06F 7/4876* (2013.01); *G06F 7/523* (2013.01); *G06F 9/3001* (2013.01); *G06F 9/30021* (2013.01)

(58) Field of Classification Search
CPC ........ G06F 7/487; G06F 7/4915; G06F 7/496; G06F 7/4983–4986; G06F 7/4876;
(Continued)

(56) References Cited

U.S. PATENT DOCUMENTS

| 5,235,339 A | 8/1993 | Morrison et al. |
| 5,586,070 A | 12/1996 | Purcell |

(Continued)

OTHER PUBLICATIONS

Fayed, Ayman, et al., "A Novel Architecture for Low-Power Design of Parallel Multipliers," IEEE 2001 (Year: 2001), 6 pages.
(Continued)

*Primary Examiner* — Emily E Larocque
(74) *Attorney, Agent, or Firm* — Renaissance IP Law Group LLP (57) ABSTRACT

An N×N multiplier may include a N/2×N first multiplier, a N/2×N/2 second multiplier, and a N/2×N/2 third multiplier. The N×N multiplier receives two operands to multiply. The first, second and/or third multipliers are selectively disabled if an operand equals zero or has a small value. If the operands are both less than $2^{N/2}$, the second or the third multiplier are used to multiply the operands. If one operand is less than $2^{N/2}$ and the other operand is equal to or greater than $2^{N/2}$, the first multiplier is used or the second and third multipliers are used to multiply the operands. If both operands are equal to or greater than $2^{N/2}$, the first, second and third multipliers are used to multiply the operands.

20 Claims, 10 Drawing Sheets

Related U.S. Application Data continuation of application No. 16/276,582, filed on Feb. 14, 2019, now Pat. No. 10,963,220.

(60) Provisional application No. 62/760,028, filed on Nov. 12, 2018.

(58) Field of Classification Search
CPC .............. G06F 7/42; G06F 7/523; G06F 7/5235–5338; G06F 7/544; G06F 7/5443; G06F 2207/3856; G06F 2207/4824; F06F 9/3001; F06F 9/3021
See application file for complete search history.

(56) References Cited

U.S. PATENT DOCUMENTS

| | | |
|---|---|---|
| 6,708,193 B1 | 3/2004 | Zeng |
| 6,915,322 B2 | 7/2005 | Hong |
| 7,733,123 B1 | 6/2010 | Young et al. |
| 2004/0010536 A1 | 1/2004 | Moreno et al. |
| 2005/0187997 A1 | 8/2005 | Zheng et al. |
| 2018/0046605 A1 | 2/2018 | Hickey et al. |
| 2018/0052661 A1 | 2/2018 | Langhammer |
| 2018/0189056 A1 | 7/2018 | Turakhia et al. |

OTHER PUBLICATIONS

Moshnyaga, Vasily G , "Power Reduction Techniques for Digital Array Multipliers," IEEE 2007 (Year: 2007), 5 pages.
Notice of Allowance for U.S. Appl. No. 16/276,582, dated Nov. 23, 2020.
Notice of Allowance for U.S. Appl. No. 17/151,115, dated Oct. 11, 2022.

SIGNED MULTIPLICATION USING UNSIGNED MULTIPLIER WITH DYNAMIC FINE-GRAINED OPERAND ISOLATION

CROSS-REFERENCE TO RELATED APPLICATION

This application is a continuation of U.S. patent application Ser. No. 17/151,115, filed Jan. 15, 2021, which is a continuation of U.S. patent application Ser. No. 16/276,582, filed Feb. 14, 2019, now issued as U.S. Pat. No. 10,963,220, which claims the priority benefit under 35 U.S.C. § 119(e) of U.S. Provisional Patent Application Ser. No. 62/760,028, filed Nov. 12, 2018, the disclosures of which are incorporated herein by reference in their entirety.

TECHNICAL FIELD

The subject matter disclosed herein generally relates to computational circuits. More specifically, the subject matter disclosed herein relates to an unsigned multiplier that performs signed and unsigned multiplication.

BACKGROUND

Neural-network models typically have many weights that are zeros (e.g., 50%) and many activations are zeros (e.g., 50%-90%). Accordingly, power may be saved by not performing any multiply-by-zero operations. Additionally, the absolute values of the weights and the activations of neural-network models are typically close to zero. For example, typically 95% of non-zero 8-bit multiply operations includes at least one operand having abs (w)≤15 or abs(a)≤15. Power may also be saved by taking advantage of the absolute values of the weights and activations that are close to zero.

SUMMARY

An example embodiment provides a multiplier may include an N-bit×N-bit multiplier and a control circuit. The N-bit×N-bit multiplier may receive a first operand that may include N bits and a second operand that may include N bits, and the N-bit×N-bit multiplier may include a first multiplier and a second multiplier. The first multiplier may include an N/2-bit×N-bit multiplier and the second multiplier may include an N/2-bit×N-bit multiplier. The control circuit may be coupled to the first and second operands and may disable the first and second multipliers if the value of the first operand or the value of the second operand equals zero. The control circuit may further control the second multiplier to multiply the first operand and the second operand if the absolute value of the first operand or the absolute value of the second operand is less than $2^{N/2}$. The control circuit may also control the first multiplier and control the second multiplier to multiply the first operand and the second operand if the absolute values of both the first and second operands are equal to or greater than $2^{N/2}$. In one embodiment, the second multiplier may include a third multiplier and a fourth multiplier in which the third multiplier may be an N/2-bit×N/2-bit multiplier and the fourth multiplier may be an N/2-bit×N/2-bit multiplier. The control circuit may further control the third multiplier or the fourth multiplier to multiply the first operand and the second operand if the absolute values of the first operand and the second operand are both less than $2^{N/2}$, and the control circuit may further control the first multiplier and control the third and fourth multiplier to multiply the first operand and the second operand if the absolute value of one operand of the first and second operands is less than $2^{N/2}$ and the absolute value of the other operand of the first and second operands is equal to or greater than $2^{N/2}$. Furthermore, the smaller multipliers, such as the third or fourth multipliers, may be further recursively subdivided into a pair of multipliers following same steps as above.

Another example embodiment provides a method to multiply a first operand and a second operand that may include: receiving at an N-bit×N-bit multiplier a first operand and a second operand, the first operand comprising N-bits and the second operand comprising N-bits, the N-bit×N-bit multiplier comprising a first multiplier and a second multiplier, the first multiplier comprising an N/2-bit×N-bit multiplier and the second multiplier comprising an N/2-bit×N-bit multiplier; determining whether a value of the first operand equals zero, is less than or equal to $2^{N/2}$, or is greater than $2^{N/2}$N/2 bits; determining whether a value of the second operand equals zero, is less than or equal to $2^{N/2}$, or is greater than $2^{N/2}$; disabling the first and second multipliers if the value of the first operand or the value of the second operand equals zero; controlling the second multiplier to multiply the first operand and the second operand if the absolute value of the first operand or the absolute value of the second operand is less than $2^{N/2}$; and controlling the first multiplier and the second multiplier to multiply the first operand and the second operand if the absolute values of both the first and second operands are equal to or greater than $2^{N/2}$.

Still another example embodiment provides a multiplier that may include an N-bit×N-bit multiplier and a controller. The N-bit×N-bit multiplier may receive a first operand comprising N bits and a second operand comprising N bits. The N-bit×N-bit multiplier may include a first multiplier and a second multiplier in which the first multiplier may include a P-bit×N-bit multiplier and the second multiplier that may include a Q-bit×N-bit multiplier in which P and Q are integers, P+Q=N and P>Q. The control circuit may be coupled to the first and second operands, the circuit may disable the first and second multipliers if a value of the first operand or a value of the second operand equals zero. The control circuit may further control the second multiplier to multiply the first operand and the second operand if the absolute value of the first operand or the absolute value of the second operand is less than $2^{Q}$. The control circuit may control the first multiplier and may control the second multiplier to multiply the first operand and the second operand if the absolute values of both the first and second operands are equal to or greater than $2^{Q}$. In one embodiment, the second multiplier may include a third multiplier and a fourth multiplier in which the third multiplier may include an R-bit×Q-bit multiplier and the fourth multiplier may include an S-bit×Q-bit multiplier in which R and S are integers, R+S=Q and R>S. The control circuit may further control the third multiplier or the fourth multiplier to multiply the first operand and the second operand if the absolute values of the first operand and the second operand are both less than $2^{S}$, and the control circuit may further control the first multiplier or may control the third and fourth multiplier to multiply the first operand and the second operand if the absolute value of one operand of the first and second operands is less than $2^{S}$ and the absolute value of the other operand of the first and second operands is equal to or greater than $2^{S}$.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "module," as used herein, refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides an unsigned multiplier to perform signed and unsigned multiplication. Additionally, the subject matter disclosed herein provides a multiplier in which sections of the multiplier may be disabled or powered down if a multiply-by-a-small number condition or a multiply-by-zero condition is detected, thereby reducing the amount of power used during a multiply operation. Thus, the subject matter disclosed herein may take advantage of the fact that the weights and activations of a neural network may be small or zero in order to reduce the power used by a multiplier when multiplying the weights and activations.

Although some multiplier embodiments disclosed herein are configured as N×N multipliers, the subject matter disclosed herein is not so limited. Some multiplier embodiments according to the subject matter disclosed herein may be configured as N×M multipliers in which N=M or N M.

Figure 1:
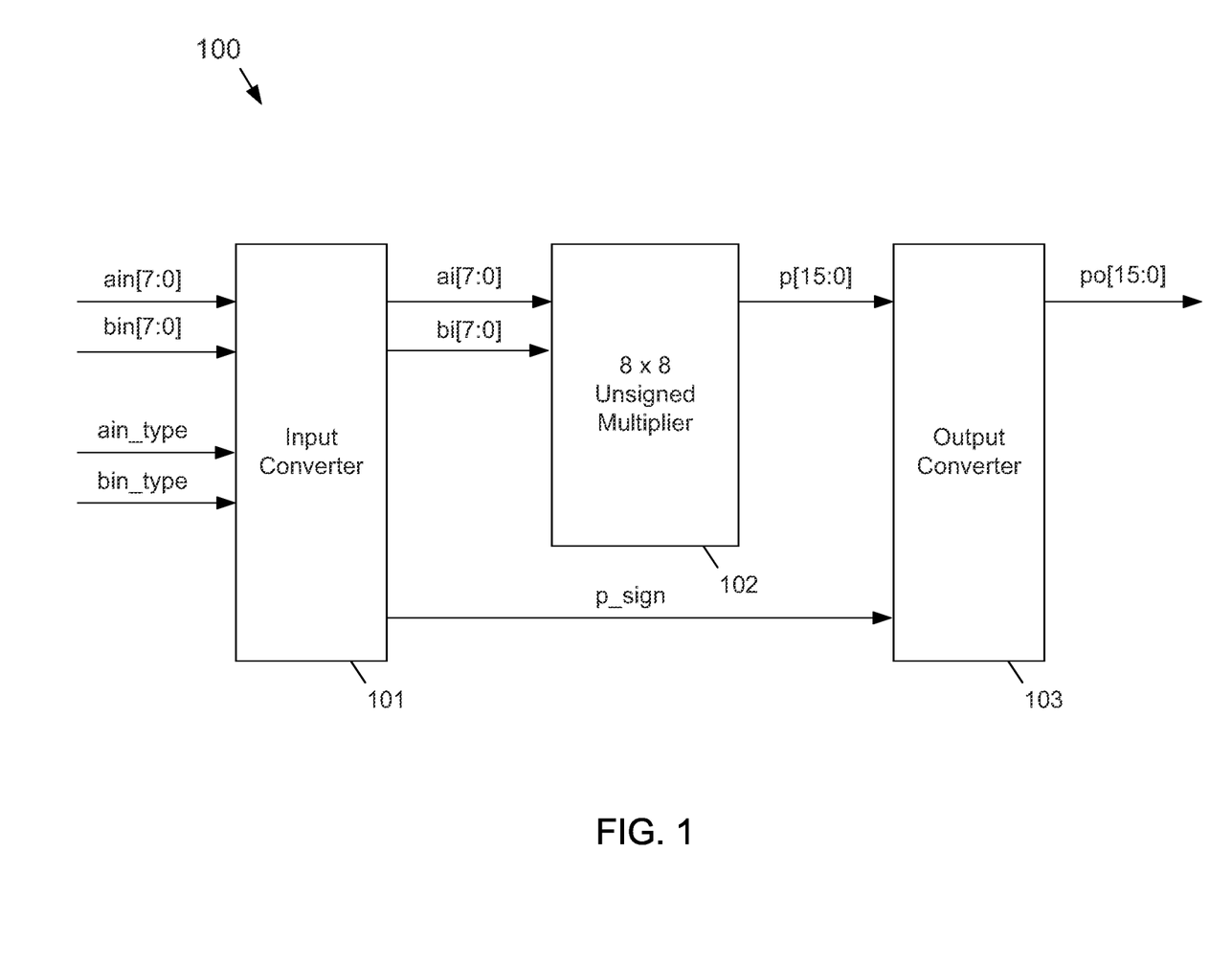
FIG. 1 depicts a functional block diagram of an example embodiment of a multiplier according to the subject matter disclosed herein.

FIG. 1 depicts a functional block diagram of an example embodiment of a multiplier 100 according to the subject matter disclosed herein. The multiplier 100 computes product po of ain and bin in which ain may be signed or unsigned, bin may be signed or unsigned and the product po may be signed or unsigned. The output po is signed if the resulting product is negative. The multiplier 100 includes an input converter 101, an 8-bit×8-bit unsigned multiplier 102 and an output converter 103. The input converter 101 receives two 8-bit operands ain[7:0] and bin[7:0] and a 1-bit type signal for each operand. If an operand is an unsigned operand, the 1-bit type signal equals 0, and if an operand is a signed operand, the 1-bit type signal represents the sign of the operand. The input converter 101 outputs the two operands as unsigned ai[7:0]:=abs(ain[7:0]) and unsigned bi[7:0]:=abs(bin[7:0]) to the unsigned multiplier 102. The input converter 101 also outputs a p_sign signal that indicates the sign of the resulting product: p_sign:=sign(ain) xor sign(bin). Sign(ain) is 1 if ain is signed and negative and 0 otherwise. Sign(bin) is 1 if bin is signed and negative and 0 otherwise. The unsigned multiplier 102 multiplies the two unsigned input operands ai[7:0] and bi[7:0] and outputs a 16-bit product signal p[15:0]. The output converter 103 converts the 16-bit unsigned product signal p[15:0] to an output signal po[15:0] that can be signed or unsigned, depending on the p_sign signal. Specifically, po:=−p if p_sign==1, otherwise po:=p.

In one embodiment, the input converter 101, the multiplier 102 and/or the output converter 103 may be or may include one or more modules that provide the functionality of the device. For example, in one embodiment, the input converter 101, the multiplier 102 and/or the output converter 103 may include hardware logic circuits to perform some or all of the functionality of the device. As another example, another embodiment may include a processor (not shown) that executes software and/or firmware that may provide the functionality provided by the converter 101, the multiplier 102 and/or the converter 103.

Although the multiplier 102 is depicted as an 8-bit×8-bit multiplier, the subject matter disclosed herein is not limited to 8-bit×8-bit multipliers. In other embodiments, the multiplier 102 may be embodied as a signed or an unsigned 16-bit×16-bit multiplier, as a signed or an unsigned 16-bit× 8-bit multiplier, as a signed or an unsigned 8-bit×8-bit multiplier that may use multi-cycling, i.e., using multiple clock cycles to generate and accumulate partial products, such as two clock cycles to complete a 16-bit×8-bit or 8-bit×16-bit signed or unsigned multiplication or four clock cycles to complete a 16-bit×16-bit signed or unsigned multiplication. In one embodiment, the multiplier 102 may be configured to be two 4-bit×8-bit multipliers in which one of the 4-bit×8-bit multipliers may be configured to be two 4-bit×4-bit multipliers. In still another embodiment, the multiplier 102 may be subdivided recursively into halves, for example, a 16-bit×16-bit multiplier may be divided into two 16-bit×8-bit multipliers in which one 16-bit×8-bit multiplier may be further divided into two 8-bit×8-bit multipliers, in which one of the 8-bit×8-bit multipliers may be divided into two 4-bit×4-bit multipliers. Further, a multiplier may be divided in an uneven manner to form, for example, an 8-bit×5-bit multiplier and an 8-bit×3-bit multiplier from an 8-bit×8-bit multiplier.

Figure 2:
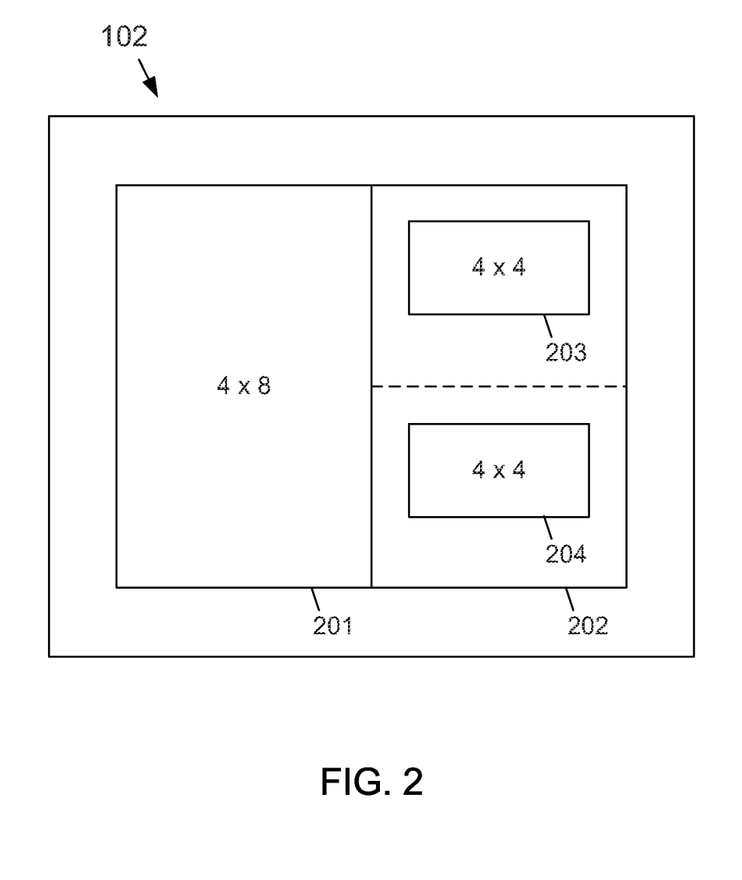
FIG. 2 depicts an example embodiment of the multiplier configured as two 4-bit×8-bit multipliers according to the subject matter disclosed herein.

FIG. 2 depicts an example embodiment of the multiplier 102 configured as two 4-bit×8-bit multipliers 201 and 202 according to the subject matter disclosed herein. Additionally, the multiplier 202 may be configured as two 4-bit×4-bit multipliers 203 and 204. The configuration depicted in FIG. 2 allows the multiplier 102 to receive and perform a multiply operation using two 8-bit operands. If one of the 8-bit operands has absolute value that is less than or equal to 15, it can be treated as a 4-bit operand and the 8-bit other operand has its absolute value that is greater than 15 and is treated as an 8-bit operand, then the multiplier 201 may be controlled to receive the two operands and perform a 4-bit× 8-bit multiply. In such a situation, the multiplier 202 (i.e., multipliers 203 and 204) may be disabled by, for example, fixing, or "freezing," the inputs to the multiplier(s) to prevent the logic of the multiplier from toggling or by powering down the multiplier(s), thereby reducing the amount of power used during the multiply operation. In an alternative configuration, the multiplier 202 may be used to perform the 4-bit×8-bit multiply operation, while the multiplier 201 may be powered down or made non-operative during the multiply operation. In still another embodiment, each of the multiplier 201 and the multiplier 202 may be formed from two 4-bit×4-bit multipliers.

If both of the operands are 4-bit operands—that is absolute values of both 8-bit inputs are less than or equal to 15—then one of the 4-bit×4-bit multipliers 203 or 204 may be controlled to receive the operands while the unused 4-bit×4-bit multiplier and the multiplier 201 may be powered down or made non-operative during the multiply operation.

If both of the operands are 0, then the multiplier 102 may be disabled or powered down during the multiply operation, as described in more detail below.

Figure 3:
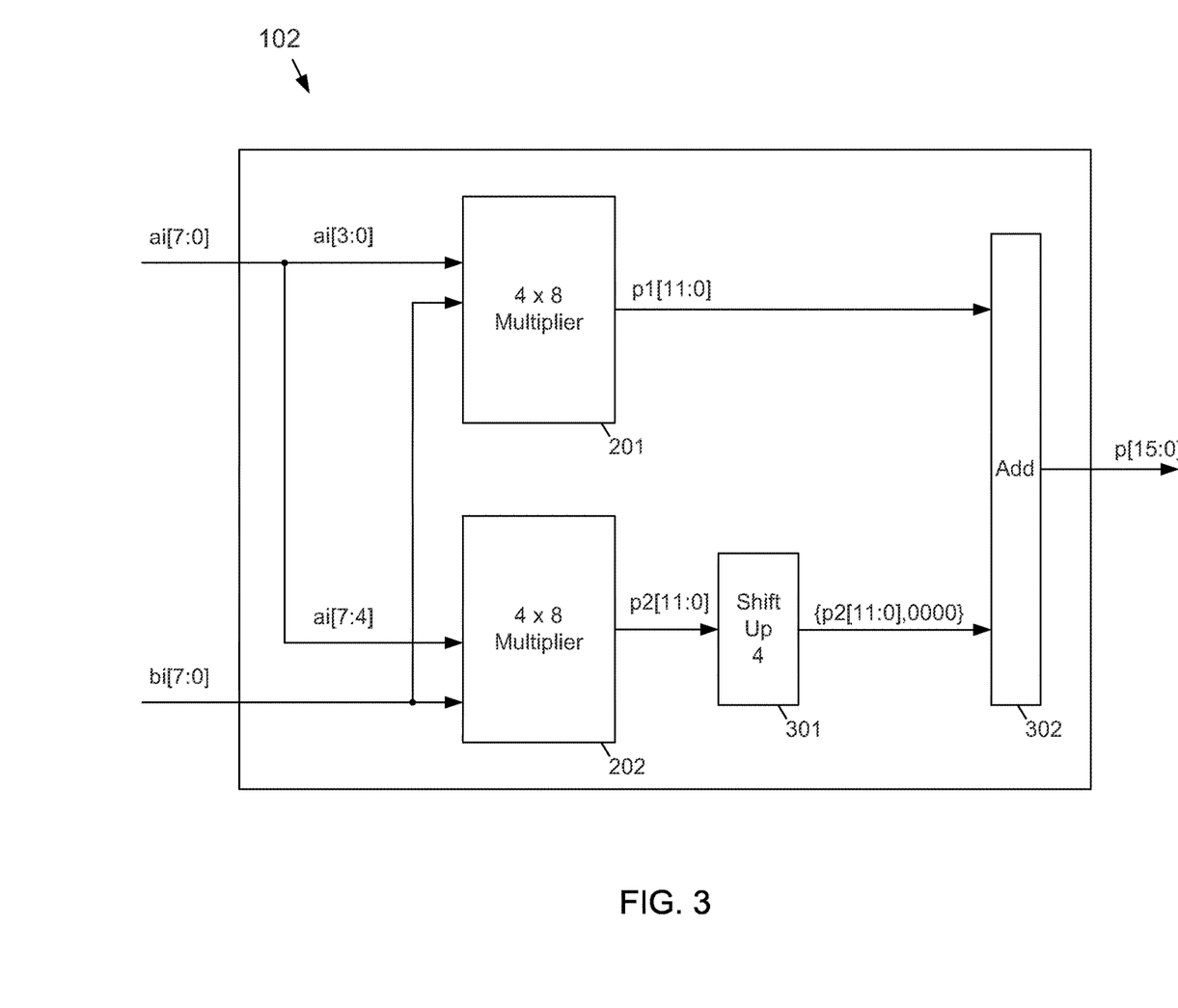
FIG. 3 depicts a functional block diagram of an example embodiment of a multiplier when configured and operated as an 8-bit×8-bit multiplier using two 4-bit×8-bit multipliers according to the subject matter disclosed herein.

FIG. 3 depicts a functional block diagram of an example embodiment of the multiplier 102 when configured and operated as an 8-bit×8-bit multiplier using two 4-bit×8-bit multipliers (FIG. 2) according to the subject matter disclosed herein. The 4-bit×8-bit multiplier 201 and the 4-bit× 8-bit multiplier 202 respectively receive a first 8-bit operand ai[7:0] and a second 8-bit operand bi[7:0]. The multiplier 201 also receives lower 4 bits ai[3:0] of input ai[7:0], while multiplier 202 also receives upper 4 bits of ai[7:4] or input ai[7:0]. The operand ai[7:0] may, for example, represent the value of a weight, and the operand bi[7:0] may represent the value of an activation. The multiplier 201 outputs a product p1[11:0] and the multiplier 202 outputs a product p2[11:0]. The product p2[11:0] is shifted up by 4 bits (i.e., shifted by 4 bits to the left) by a shift circuit 301. An adder 302 adds the output of multiplier 201 and the output of the shift circuit 301 to form an output p[15:0]. The output p[15:0] may correspond to the p[15:0] output in FIG. 1.

In a situation in which ain has a small value that can be represented by a 4-bit unsigned number (i.e., ai≤15) and bin has a large value (i.e., bi≥15), multiplier 201 alone is sufficient to compute the product, while multiplier 202 can be disabled and its output set to zero. Such a situation may occur if a neural network uses the Rectified Linear Unit (ReLU) activation function.

In a situation in which bin has a small value that can be represented by a 4-bit unsigned number (i.e., bi≤15) and a weight has a large value (i.e., ai≥15), the operands may be swapped so that the small-value bin operand is again input to the 4-bit input of the multiplier 201, while multiplier 202 is kept disabled and its output set to zero. Such a situation may occur if a neural network uses a tan h( ) activation function instead of a Rectified Linear Unit (ReLU) activation function.

Figure 4:
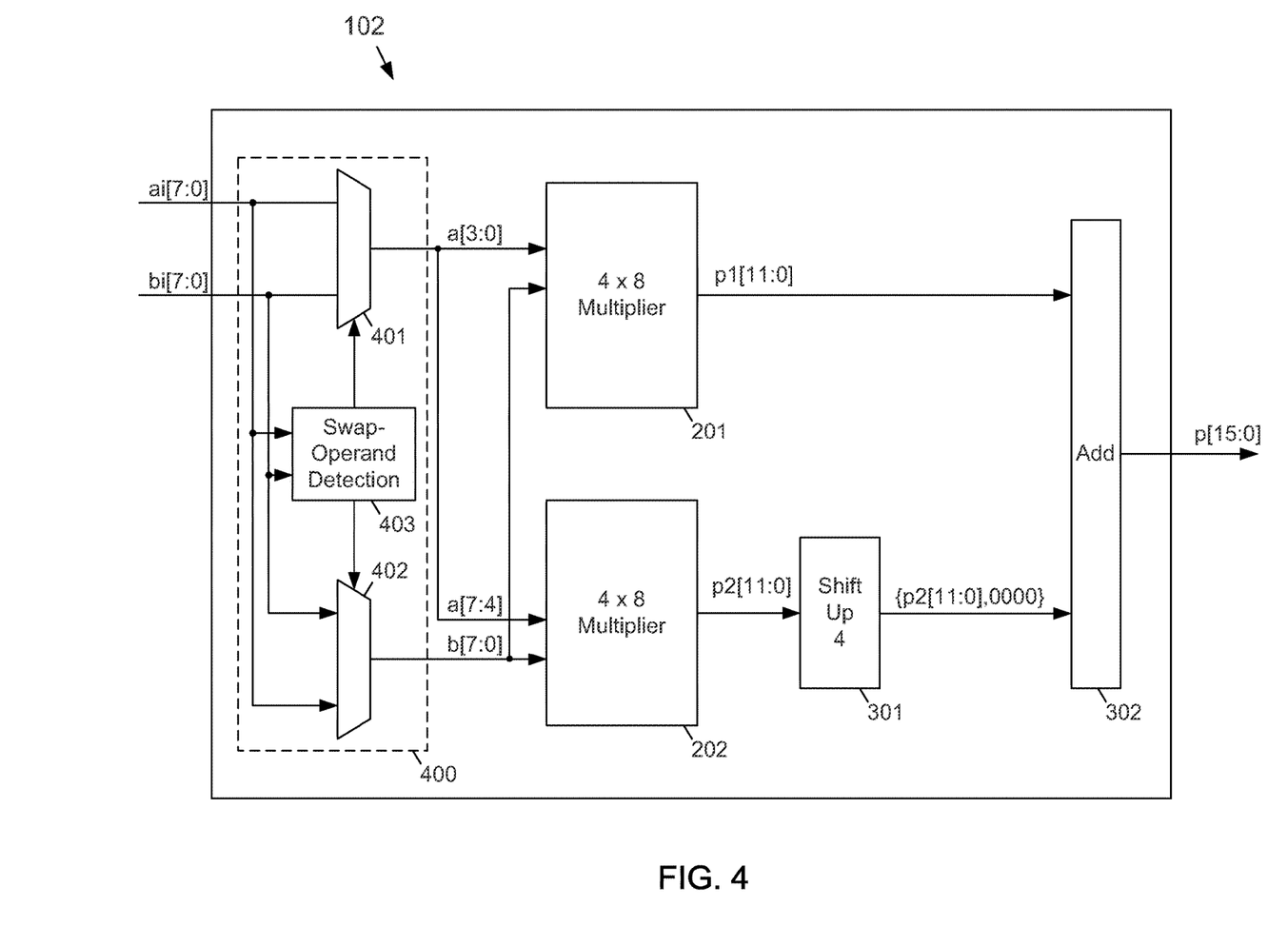
FIG. 4 depicts a functional block diagram of an example embodiment of a multiplier when one operand is small and the other operand is large according to the subject matter disclosed herein.

FIG. 4 depicts a functional block diagram of an example embodiment of the multiplier 102 when one operand is small and the other operand is large according to the subject matter disclosed herein. As depicted in FIG. 4, the multiplier 102 includes a swap-operand circuit 400. The swap-operand circuit 400 includes a first multiplexer 401, a second multiplexer 402 and a swap-operand detection circuit 403. The swap-operand detection circuit 403 receives the input operands ai[7:0] and bi[7:0] and detects whether two operands should be swapped based on their magnitudes.

If, for example, an activation input bi[7:0] has a small value that fits into 4 bits (i.e., bi≤15), and a weight input ai[7:0] has a large value (i.e., ai≥15), the swap-operand detection circuit 403 controls the first and second multiplexers 401 and 402 so that the activation input bi[7:0] is output from the first multiplexer 401 as a[7:0] and so the weight input ai[7:0] is output from the second multiplexer 402 as b[7:0]. The multiplier 201 multiplies the activation a[3:0] and the weight b[7:0]. One input to the multiplier 202 is an operand that equals 0 (i.e., a[7:4]=0), so the multiplier 202 may be controlled to be disabled or powered down, as described in more detail below.

As another example, if a weight input ai[7:0] is small, and an activation bi[7:0] is large, the swap-operand detection circuit 403 controls the first and second multiplexers 401 and 402 so that the weight input ai[7:0] is output from the first multiplexer 401 as a[7:0] and so the activation input bi[7:0] is output from the second multiplexer 402 as b[7:0]. The multiplier 201 multiplies the weight a[3:0] and the activation b[7:0]. One input to the multiplier 202 is an operand that equals 0 (i.e., a[7:4]=0), so the multiplier 202 may be controlled to be disabled or powered down, as described in more detail below.

Table 1 sets forth a truth table that may be used by the swap-operand detection circuit 400, in which "x" means "don't care" and "!" means "not." In one embodiment, when Swap Operands=0 or 1 (not x), power may be saved by disabling multiplier 202 and setting its output to zero. When Swap Operands=x, it is recommended to keep Swap Operands value from the previous clock cycle to reduce power consumption.

TABLE 1

Swap-operand detection truth table.

| ai[7:4] | ai[3:0] | bi[7:4] | bi[3:0] | Swap Operands |
|---|---|---|---|---|
| x | X | 0 | 0 | x |
| 0 | 0 | x | x | x |
| 0 | !=0 | 0 | !=0 | x |
| 0 | !=0 | !=0 | 0 | x |
| 0 | !=0 | !=0 | !=0 | 0 |
| !=0 | 0 | 0 | !=0 | x |
| !=0 | 0 | !=0 | 0 | x |
| !=0 | 0 | !=0 | !=0 | 0 |
| !=0 | !=0 | 0 | !=0 | 1 |
| !=0 | !=0 | !=0 | 0 | 1 |
| !=0 | !=0 | !=0 | !=0 | x |

When the multiplier 202 has been disabled, or idled, and its output is set to zero, the adder 302 performs a trivial operation of adding a zero. The multiplier 102 may be configured to utilize the adder 302 to perform a 5-bit×8-bit multiplication as opposed to 4-bit × 8-bit multiplication. Additionally, the logic of the swap-operand circuit 400 may be configured to not swap the operands if the operand a is effectively 5 bits or less, as opposed to 4 bits or less.

Figure 5:
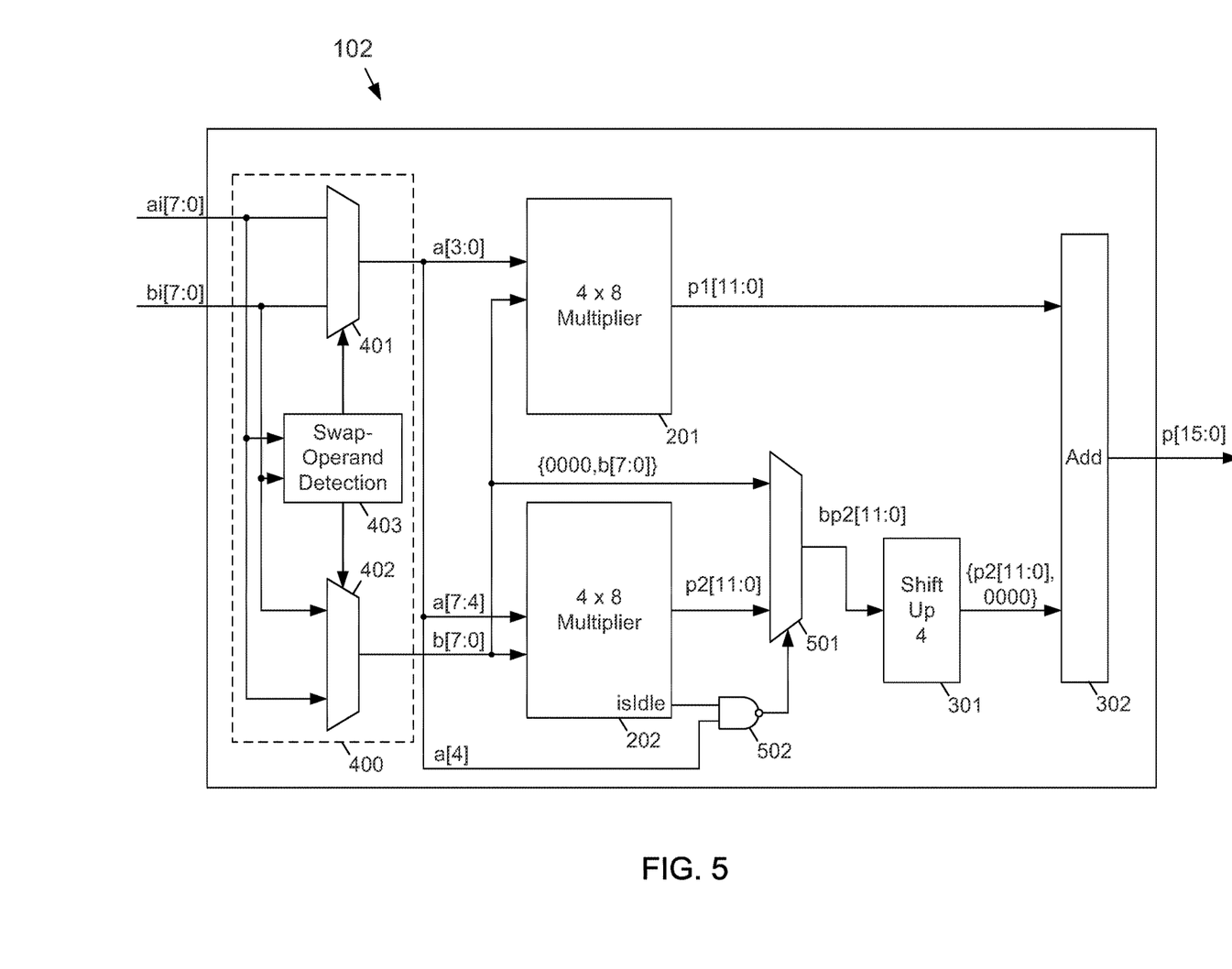
FIG. 5 depicts a functional block diagram of an example embodiment of a multiplier that has been configured to operate as a 5-bit×8-bit multiplier according to the subject matter disclosed herein.

FIG. 5 depicts a functional block diagram of an example embodiment of the multiplier 201 that has been configured to operate as a 5-bit×8-bit multiplier according to the subject matter disclosed herein. As depicted in FIG. 5, a multiplexer 501 and an NAND gate 502 may be added to the multiplier 201. One input to the multiplexer 501 is 11 bits in which the four most significant bits are 0s and the eight least significant bits (LSBs) are b[7:0]. The other input to the multiplexer 501 is the output of the multiplier 202. Bit a[4] is applied to one input of the NAND gate 502 and the other input of the NAND gate 502 receives an isIdle signal that may be output from the multiplier 202 when the multiplier 202 has been disabled, or idle. In an alternative embodiment, the isIdle signal may be generated elsewhere if the multiplier 202 has been disabled. The isIdle signal is 1 when multiplier 202 is expected to perform a multiply-by-zero operation, that is when a[7:5]=0 or b[7:0]=0.

When the operand a[7:0] has a five-bit value (i.e., a[4]=1 and a[7:5]=0), the multiplier 202 is disabled because the operand a[7:5]=0, the NAND gate 502 controls the multiplexer 501 to select the 11-bit input {0000,b[7:0]}. If the operand a[7:5]≠0, then the multiplier is not disabled and the output of the multiplier 202 is selected by the multiplexer 501.

If the operand a[7:0] is nonzero, but includes LSBs that are equal to zero, the operand may be shifted down, or to the right, so that the operands may be multiplied using the 5-bit×8-bit multiplier configuration depicted in FIG. 5. For example, if a[7:0]="01010100", a[7:5]≠0 and 5-bit by 8-bit multiplication shown in FIG. 5 cannot be used. However, a[7:0] can be shifted 2 bits down to value of "00010101", multiplied using 5-bit by 8-bit multiplier and the resulting product can be shifted back up 2 bits to compensate for the input shift. In this case, the multiplier 201 may be used while idling multiplier 202 to compute the product in some cases even when input a is larger than 5 bits (i.e. a>31).

Figure 6:
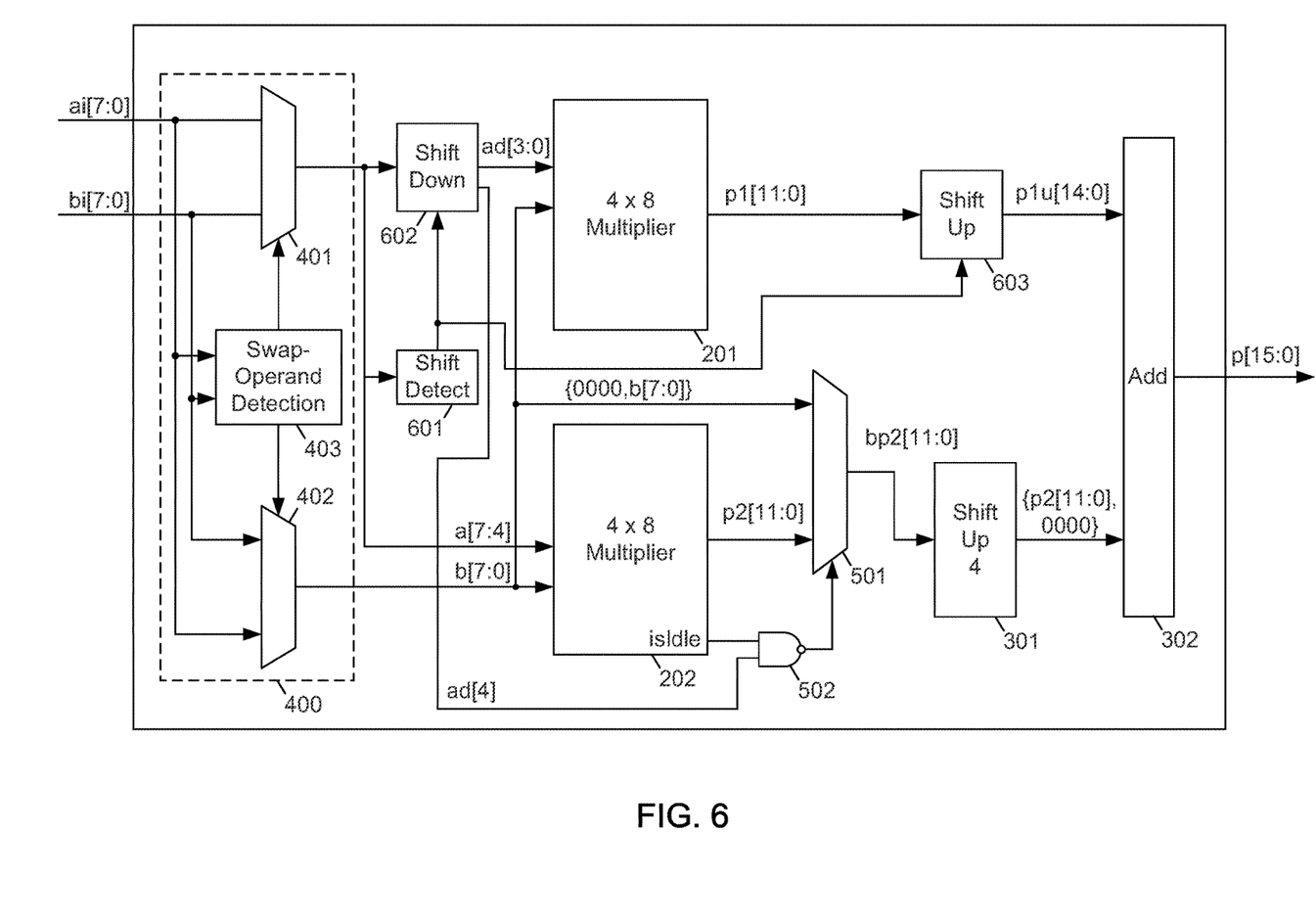
FIG. 6 depicts a functional block diagram of an example embodiment of a multiplier when configured to shift the bits of the operand a[7:0] down, or to the right, so that the operands may be multiplied by a 5-bit×8-bit multiplier according to the subject matter disclosed herein.

FIG. 6 depicts a functional block diagram of an example embodiment of the multiplier 201 when configured to shift the bits of the operand a[7:0] down, or to the right, so that the operands may be multiplied by a 5-bit×8-bit multiplier according to the subject matter disclosed herein. As depicted in FIG. 6, a shift-detect circuit 601, a shift-down circuit 602 and a shift-up circuit 603 are added to the multiplier 201. The shift-detect circuit 601 detects whether the LSBs of the operand a[7:0] are zeros. In one embodiment, a maximum of four LSBs may be detected as being zero, however, because values with large absolute magnitude tend to be rare in neural network computations, the amount of input down-shift can be limited to 1 or 2 bits to decrease hardware area without significant loss of power efficiency. The shift-detect circuit 601 controls the shift-down circuit 602 and the shift-up circuit 603 to be operable if LSBs of the operand a[7:0] are detected to be zeros. The bit a[4] of the shifted operand a is input to the NAND gate 502. The isIdle signal in multiplier 202 will be additionally active when a[7:5]=0 and the amount of shift is 1 bit or a[7:6]=0 and the amount of shift is 2 bits or a[7]=0 and the amount of shift is 3 bits and 1 if the amount of shift is 4 bits.

In one embodiment, a 4-bit×8-bit multiplier (i.e., multiplier 201 and/or multiplier 202 in FIG. 3) may be further subdivided and configured as two halves, each being a 4-bit×4-bit multiplier in a manner similar to how 8-bit×8-bit multiplier was subdivided into two halves, each being a 4-bit×8-bit multiplier. For example, the 4-bit×8-bit multiplier 201 may be configured as two 4-bit×4-bit multipliers.

Figure 7:
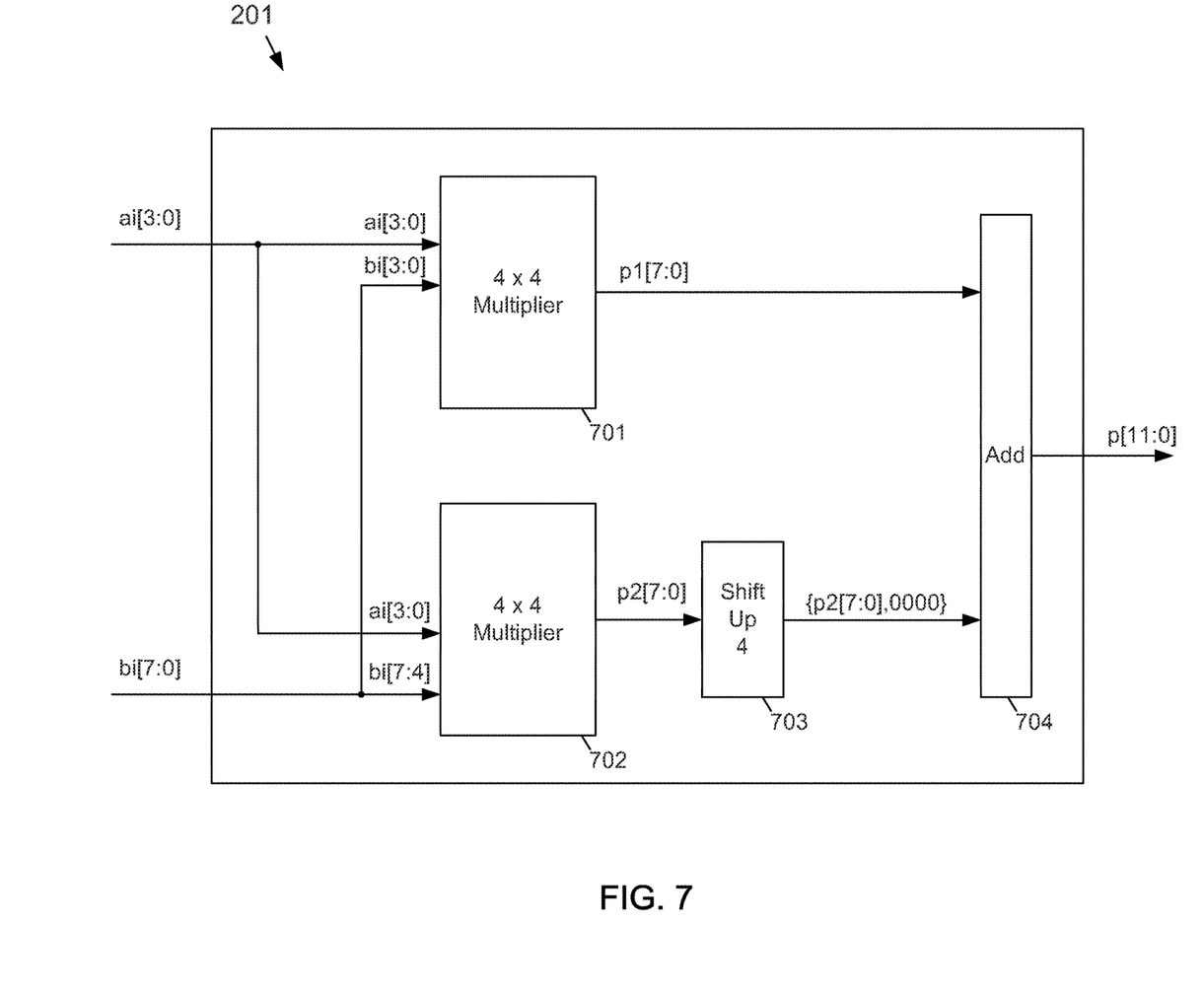
FIG. 7 depicts a functional block diagram of an example embodiment of a multiplier when configured and operated as two 4-bit×4-bit multipliers according to the subject matter disclosed herein.

FIG. 7 depicts a functional block diagram of an example embodiment of the multiplier 201 when configured and operated as two 4-bit×4-bit multipliers 701 and 702 according to the subject matter disclosed herein. As depicted in FIG. 7, the multiplier 201 receives a 4-bit operand ai[3:0] and an 8-bit operand bi[7:0]. The operand ai[3:0] may, for example, represent a weight, and the operand bi[7:0] may represent an activation. The multiplier 701 outputs a product p1[7:0] and the multiplier 702 outputs a product p2[7:0]. The product p2[11:0] is shifted up by 4 bits by a shift circuit 703, and an adder 704 adds the output of the multiplier 701 and the output of the shift circuit 703 to form an output p[11:0]. It should be understood that in an alternative embodiment, the multiplier 202 (FIG. 2) may be configured as the two 4-bit×4-bit multipliers 701 and 702.

The multiplier configuration depicted in FIG. 7 may be configured to operate as a 4-bit×5-bit multiplier, while one of the 4-bit×4-bit multipliers is kept idle for power reduction purposes.

Figure 8:
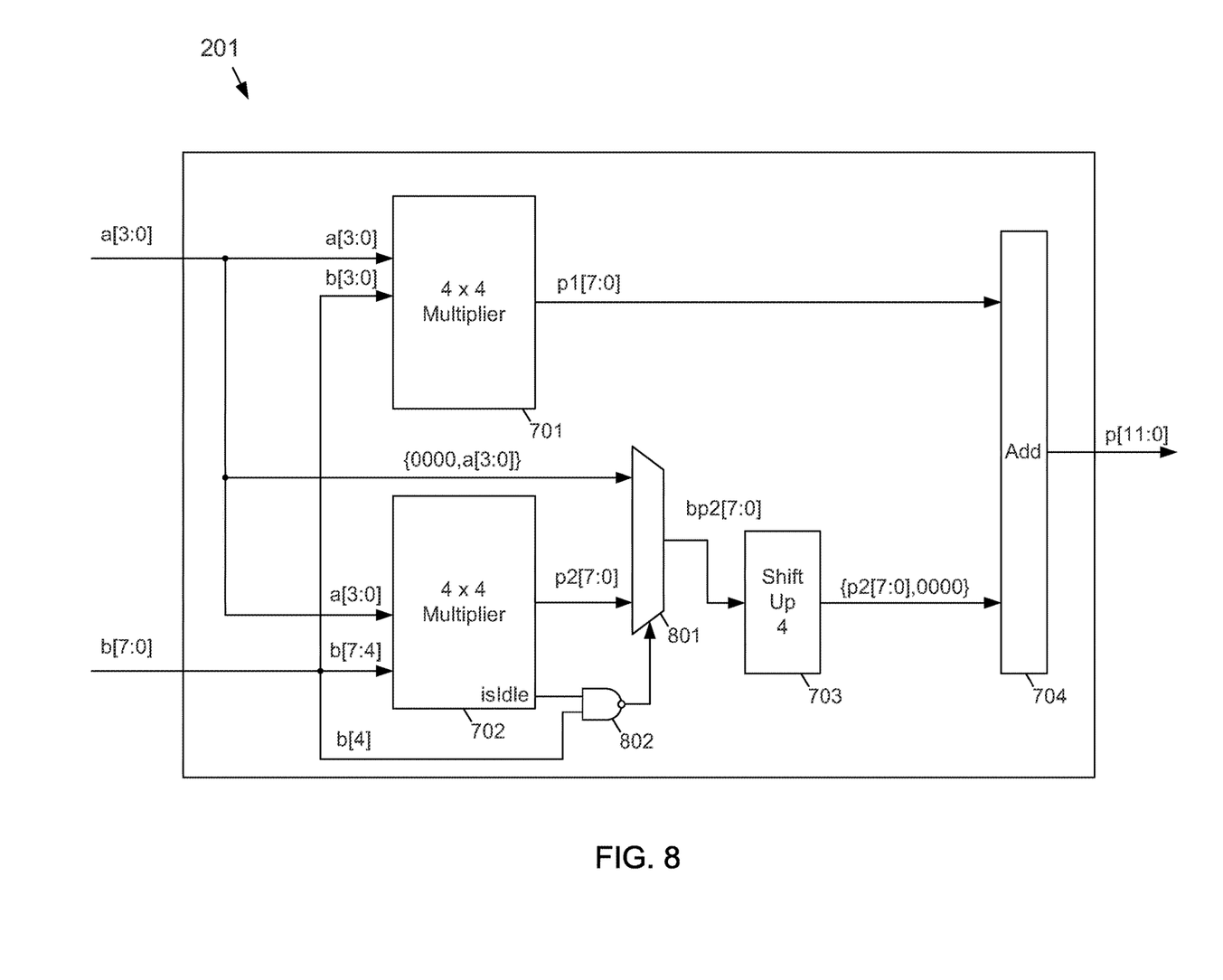
FIG. 8 depicts a functional block diagram of an example embodiment of a multiplier when configured to operate as a 4-bit×5-bit multiplier according to the subject matter disclosed herein.

FIG. 8 depicts a functional block diagram of an example embodiment of the multiplier 201 when configured to operate as a 4-bit×5-bit multiplier according to the subject matter disclosed herein. As depicted in FIG. 8, a multiplexer 801 and an NAND gate 802 may be added to the multiplier 201. One input to the multiplexer 801 is 8 bits in which the four most significant bits are 0s and the four least significant bits (LSBs) are operand a[3:0]. The other input to the multiplexer 801 is the output of the multiplier 702. Bit b[4] is applied to one input of the NAND gate 802 and the other input of the NAND gate 802 receives an isIdle signal that is output from the multiplier 702 when the multiplier 702 has been made non-operative, or idle. In an alternative embodiment, the isIdle signal may be generated elsewhere. The isIdle signal is 1 when multiplier 702 is expected to perform a multiply-by-zero operation, that is when a[3:1]=0 or b[7:4]=0.

If the operand b[7:0] is nonzero, but includes LSBs that are equal to zero, the operand may be shifted down, or to the right, so that the operands may be multiplied using the 4-bit×5-bit multiplier configuration depicted in FIG. 8, while partial product p1 is shifted up to compensate for the input downshift and multiplier 702 stays idle.

Figure 9:
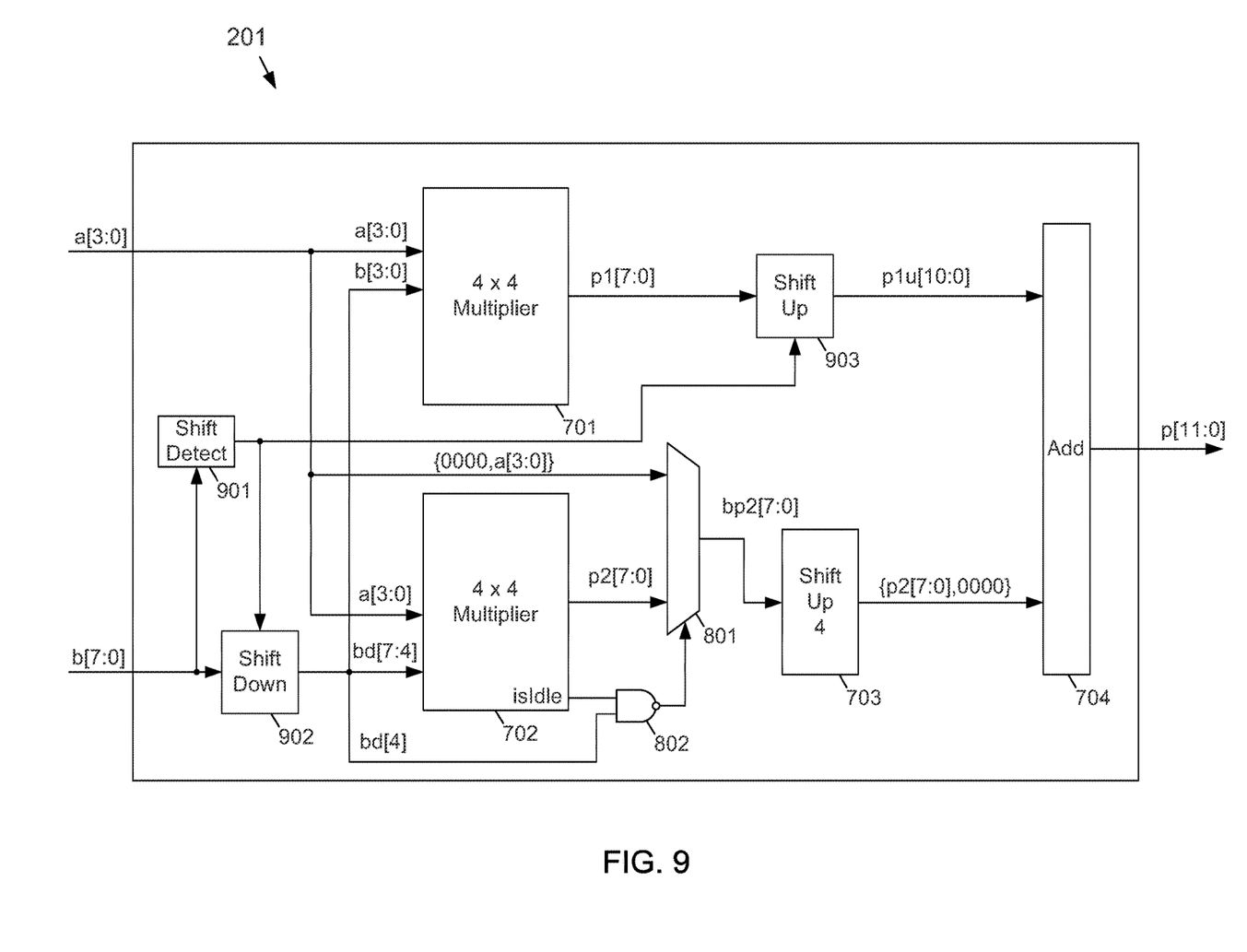
FIG. 9 depicts a functional block diagram of an example embodiment of a multiplier when configured to shift the bits of the operand b[7:0] down, or to the right, so that the operands may be multiplied by a 4-bit×5-bit multiplier according to the subject matter disclosed herein.

FIG. 9 depicts a functional block diagram of an example embodiment of the multiplier 201 when configured to shift the bits of the operand b[7:0] down, or to the right, so that the operands may be multiplied by a 4-bit×5-bit multiplier according to the subject matter disclosed herein. As depicted in FIG. 9, a shift-detect circuit 901, a shift-down circuit 902 and a shift-up circuit 903 are added to the multiplier 201. The shift-detect circuit 901 detects whether the LSBs of the operand b[7:0] are zeros. In one embodiment, a maximum of four LSBs may be detected as being zero, however, because values with large absolute magnitude tend to be rare in neural network computations, the amount of input downshift can be limited to 1 or 2 bits to decrease hardware area without significant loss of power efficiency. The shift-detect circuit 901 controls the shift-down circuit 902 and the shift-up circuit 903 to be operable if LSBs of the operand b[7:0] are detected to be zeros. The bit b[4] of the shifted operand b is input to the NAND gate 502. The isIdle signal in multiplier 702 will be additionally active when bd[7:5]=0 and the amount of shift is 1 bit or bd[7:6]=0 and the amount of shift is 2 bits or bd[7]=0 and the amount of shift is 3 bits and 1 if the amount of shift is 4 bits.

Figure 10:
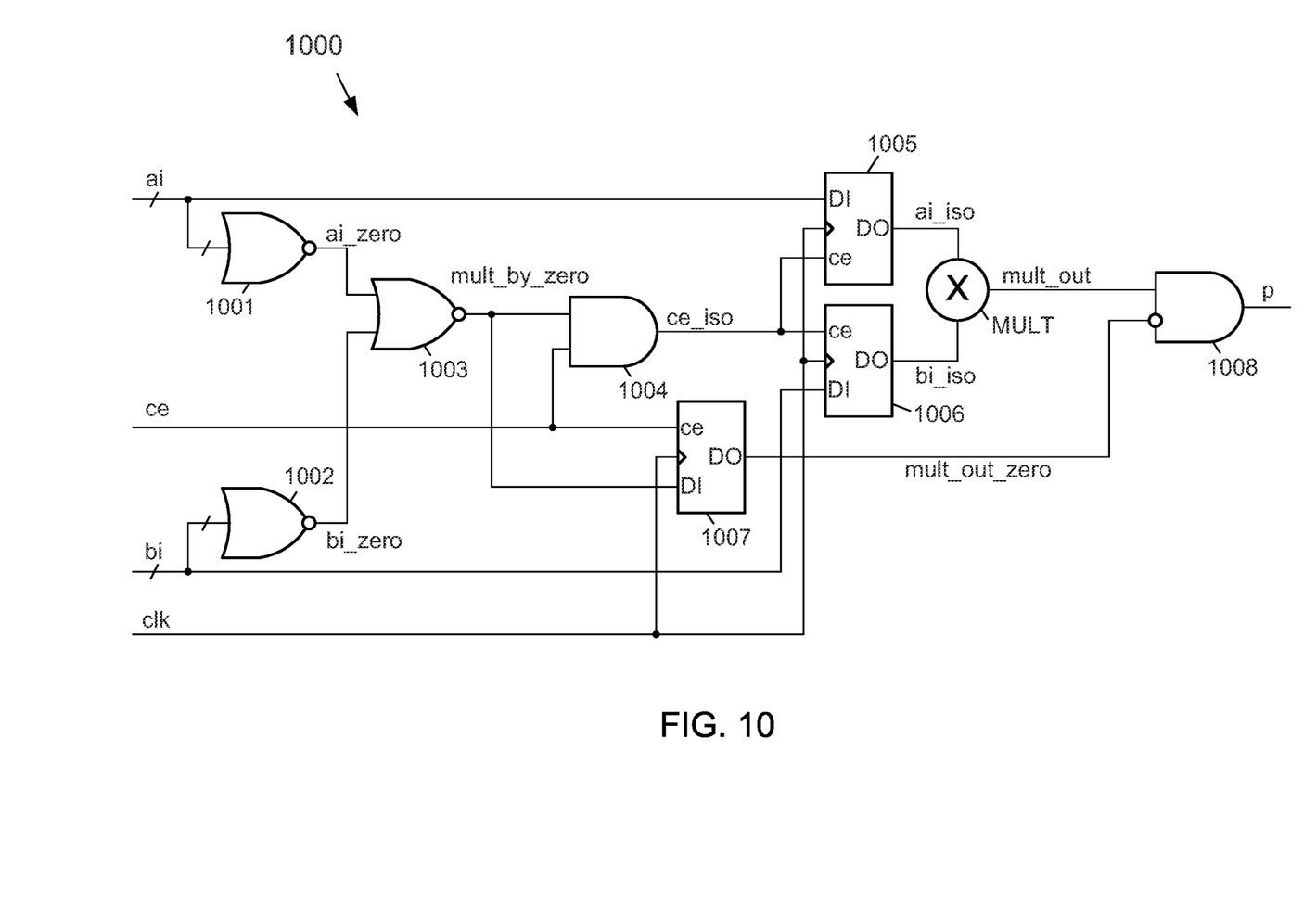
FIG. 10 depicts a functional block diagram of an example embodiment of an operand-isolation-enabled (OI) multiplier with a zero-detect circuit that may be used to control a multiplier to be disabled if an operand that is input to the multiplier is detected to be zero according to the subject matter disclosed herein.

FIG. 10 depicts a functional block diagram of an example embodiment of an operand-isolation-enabled (OI) multiplier such as 102, 201-204, 701 and 701 with a zero-detect circuit 1000 that may be used to control a multiplier MULT to be disabled if an operand that is input to the multiplier is detected to be zero according to the subject matter disclosed herein. The multiplier MULT may be any of the various architectures known in the art.

The zero-detect circuit 1000 may include three NOR gates 1001-1003, an AND gate 1004, three registers 1005-1007, and an output AND gate 1008. All of the bits of a first operand a are input to a first NOR gate 1001 and to an input of a first register 1005. All of the bits of a second operand b are input to a second NOR gate 1002 and to an input of a second register 1006. As depicted in FIG. 10, the first operand a and the second operand b each represent the entire operand, i.e., all of the bits of the operand. If the operand a is equal to zero, the first NOR gate 1001 outputs a logic high signal. Similarly, if the operand b is equal to zero, the second NOR gage 1002 outputs a logic high signal. The outputs of the first and second NOR gates 1001 and 1002 are input to the third NOR gate 1003. The output of the third NOR gate 1003 is a logic low if either the operand a or the operand b is equal to zero. A logic low output from the third NOR gate 1003 forces the ce signal low thus disabling the first operand a and the second operand b from respectively registering in the first and second registers 1005 and 1006.

If one or both of the operands a and b are equal to zero, the outputs of the first and second registers 1005 and 1006 do not change and the inputs to the multiplier MULT are fixed, or frozen and thus do not consume dynamic power. The register 1007 also registers that a logic low has been output from the third NOR gate 1003, which disables an output from the AND gate 1008. Thus, the logic of the multiplier MULT has been disabled from toggling, thereby reducing the amount of power used during the multiply operation. In another embodiment, the zero-detect circuit 1000 alternatively or additionally control power applied to the multiplier MULT.

If both the first operand a and the second operand b are not equal to zero, the AND gate 1004 allows the ce signal to respectively enable registering the first and second operands into the first and second registers 1005 and 1006. The multiplier MULT performs a multiply operation using the first operand a and the second operand b. The register 1007 also registers that a logic high has been output from the third NOR gate 1003, thereby enabling the AND gate 1008 to pass the output from the multiplier MULT.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:
1. A multiplier, comprising:
a convert-input circuit configured to receive a first operand and a second operand, and to output a negative-sign signal based on one of the first operand and the second operand being a negative value;
an N bit×N bit multiplier comprising a first multiplier and a second multiplier, the first multiplier comprising an

N/2 bit×N bit multiplier and the second multiplier comprising an N/2 bit×N bit multiplier;

a control circuit configured to disable the first and second multipliers based on a value of a third operand that is coupled to an input of the first multiplier being equal to zero or a value of a fourth operand that is coupled to an input of the second multiplier being equal to zero, the third operand being unsigned and corresponding to the first operand and the fourth operand being unsigned and corresponding to the second operand; and a convert-output circuit configured to convert an output of the multiplier to a negative value based on the negative-sign signal.

2. The multiplier of claim 1, wherein the control circuit is configured to further control the second multiplier to multiply the third operand and the fourth operand based on an absolute value of the third operand or an absolute value of the fourth operand being less than $2^{N/2}$, and to control the second multiplier to multiply the third operand and the fourth operand based on the absolute values of both the third and fourth operands being equal to or greater than $2^{N/2}$.

3. The multiplier of claim 2, wherein the second multiplier comprises a third multiplier and a fourth multiplier, the third multiplier comprising an N/2 bit×N/2 bit multiplier and the fourth multiplier comprising an N/2 bit×N/2 bit multiplier, and wherein the control circuit is further configured to control the third multiplier or the fourth multiplier to multiply the third operand and the fourth operand based on the absolute values of the third operand and the fourth operand both being less than $2^{N/2}$, and wherein the control circuit is further configured to control the first multiplier and controls the third and fourth multiplier to multiply the third operand and the fourth operand based on the absolute value of one operand of the third and fourth operands being less than $2^{N/2}$ and the absolute value of the other operand of the third and fourth operands being equal to or greater than $2^{N/2}$.

4. The multiplier of claim 3, wherein the absolute values of the third operand and the fourth operand are both less than $2^{N/2}$, the control circuit is further configured to disable the first multiplier and the fourth multiplier and to control the third operand to be input to a first N/2 bit operand input of the third multiplier and the fourth operand to be input to a second N/2 bit operand input of the third multiplier.

5. The multiplier of claim 3, wherein the absolute values of the third operand and the fourth operand are both less than $2^{N/2}$, the control circuit is further configured to disable the first multiplier and the third multiplier and to control the third operand to be input to a first N/2 bit operand input of the fourth multiplier and the fourth operand to be input to a second N/2 bit operand input of the fourth multiplier.

6. The multiplier of claim 3, wherein the absolute value of one operand of the third and fourth operands is less than $2^{N/2}$ and the absolute value of the other operand of the third and fourth operands is equal to or greater than $2^{N/2}$, the control circuit is further configured to disable the first multiplier and to control the operand that has an absolute value that is less than $2^{N/2}$ to be input to a first N/2 bit operand input of the third multiplier and to be input to a first N/2 bit operand input of the fourth multiplier, and to control a four least-significant bits of the operand having an absolute value that is equal to or greater than $2^{N/2}$ to be input to a second N/2 bit operand input of the third multiplier and a four most-significant bits of the operand having an absolute value that is equal to or greater than $2^{N/2}$ to be input to a second N/2 bit operand input of the fourth multiplier.

7. The multiplier of claim 1, wherein the absolute value of one operand of the third and fourth operands is less than $2^{N/2}$ and the absolute value of the other operand of the third and fourth operands is equal to or greater than $2^{N/2}$, the control circuit is further configured to disable the second multiplier and to control the operand having an absolute value that is less than $2^{N/2}$ to be input to an N/2 bit operand input of the first multiplier and the operand having an absolute value that is equal to or greater than $2^{N/2}$ to be input to an N bit operand input of the first multiplier.

8. A method to multiply operands, the method comprising:

receiving, at a convert-input circuit, a first operand and a second operand;

receiving at an N bit×N bit multiplier a third operand that is unsigned and corresponds to the first operand and a fourth operand that is unsigned and corresponds to the second operand, the third operand comprising N bits and the fourth operand comprising N bits, the N bit×N bit multiplier comprising a first multiplier and a second multiplier, the first multiplier comprising an N/2 bit×N bit multiplier and the second multiplier comprising an N/2 bit×N bit multiplier;

determining whether an absolute value of the third operand equals zero, is less than or equal to $2^{N/2}$, or is greater than $2^{N/2}$ bits;

determining whether an absolute value of the fourth operand equals zero, is less than $2^{N/2}$, or is equal to or greater than $2^{N/2}$;

disabling the first and second multipliers based on a value of the third operand or the value of the fourth operand equaling zero; and outputting, by a convert-output circuit, a negative-sign signal based on one of the first operand and the second operand being a negative value.

9. The method of claim 8, further comprising:

controlling the second multiplier to multiply the third operand and the fourth operand based on the absolute values of the third operand or the fourth operand being less than $2^{N/2}$; and controlling the first multiplier and the second multiplier to multiply the third operand and the fourth operand based on the absolute values of both the third and fourth operands being equal to or greater than $2^{N/2}$.

10. The method of claim 9, wherein the second multiplier comprises a third multiplier and a fourth multiplier, the third multiplier comprising an N/2 bit×N/2 bit multiplier and the fourth multiplier comprising an N/2 bit×N/2 bit multiplier, the method further comprising:

controlling the third multiplier or the fourth multiplier to multiply the third operand and the fourth operand based on the absolute values of the third operand and the fourth operand are both less than $2^{N/2}$, and controlling the first multiplier and controlling the third and fourth multiplier to multiply the third operand and the fourth operand based on the absolute value of one operand of the third and fourth operands is less than $2^{N/2}$ and the absolute value of the other operand of the third and fourth operands is equal to or greater than $2^{N/2}$.

11. The method of claim 10, wherein the absolute values of the third operand and the fourth operand are both less than $2^{N/2}$, the method further comprising:
controlling the third operand to be input to a first N/2 bit operand input of the third multiplier and the fourth operand to be input to a second N/2 bit operand input of the third multiplier, or
controlling the third operand to be input to a first N/2 bit operand input of the fourth multiplier and the fourth operand to be input to a second N/2 bit operand input of the fourth multiplier.

12. The method of claim 10, wherein the absolute value of one operand of the third and fourth operands is less than $2^{N/2}$ and the absolute value of the other operand of the third and fourth operands is equal to or greater than $2^{N/2}$,
the method further comprising controlling the operand having an absolute value that is less than $2^{N/2}$ to be input to a first N/2 bit operand input of the third multiplier and to a first N/2 bit operand input of the fourth multiplier, and controlling a four least-significant bits of the operand having an absolute value that is equal to or greater than $2^{N/2}$ to a second N/2 bit operand input of the third multiplier and a four most-significant bits of the operand having an absolute value that is equal to or greater than $2^{N/2}$ to a second N/2 bit operand input of the fourth multiplier.

13. The method of claim 9, wherein the absolute value of one operand of the third and fourth operands is less than $2^{N/2}$ and the absolute value of the other operand of the third and fourth operands is equal to or greater than $2^{N/2}$,
the method further comprising controlling the operand having an absolute value that is less than $2^{N/2}$ to be input to an N/2 bit operand input of the first multiplier and the operand having an absolute value that is equal to or greater than $2^{N/2}$ to be input to an N bit operand input of the first multiplier.

14. A multiplier, comprising:
a convert-input circuit configured to receive a first operand and a second operand corresponding to the second operand, and to output a negative-sign signal if one of the first operand and the second operand is a negative value;
an N bit×N bit multiplier comprising a first multiplier and a second multiplier, the first multiplier comprising a P bit×N bit multiplier and the second multiplier comprising a Q bit×N bit multiplier in which P and Q are integers, P+Q=N and P>Q;
a control circuit configured to disable the first and second multipliers based on a value of a third operand coupled to the first multiplier or a value of a fourth operand coupled the second operand is equal to zero, the third operand being unsigned and corresponding to the first operand and the fourth operand being unsigned and corresponding to the second operand; and
a convert-output circuit configured to convert an output of the multiplier to a negative value based on the negative-sign signal.

15. The multiplier of claim 14, wherein the control circuit further is further configured to control the second multiplier to multiply the third operand and the fourth operand based on an absolute value of the third operand or an absolute value of the fourth operand is less than $2^Q$, and
the control circuit is further configured to control the first multiplier and to control the second multiplier to multiply the third operand and the fourth operand based on the absolute values of both the third and fourth operands being equal to or greater than $2^Q$.

16. The multiplier of claim 15, wherein the second multiplier comprises a third multiplier and a fourth multiplier, the third multiplier comprising an R bit×Q bit multiplier and the fourth multiplier comprising an S bit×Q bit multiplier in which R and S are integers, R+S=Q and R>S, and
wherein the control circuit is further configured to control the third multiplier or the fourth multiplier to multiply the third operand and the fourth operand based on the absolute values of the third operand and the fourth operand both being less than $2^S$, and
wherein the control circuit is further configured to control the first multiplier or controls the third and fourth multiplier to multiply the third operand and the fourth operand based on the absolute value of one operand of the third and fourth operands being less than $2^S$ and the absolute value of the other operand of the third and fourth operands being equal to or greater than $2^S$.

17. The multiplier of claim 16, wherein the absolute values of the third operand and the fourth operand are both less than $2^S$,
the control circuit is further configured to disable the first multiplier and the fourth multiplier and control the third operand to be input to an R bit operand input of the third multiplier and the fourth operand to be input to a Q bit operand input of the third multiplier.

18. The multiplier of claim 16, wherein the absolute values of the third operand and the fourth operand are both less than $2^S$,
the control circuit is further configured to disable the first multiplier and the third multiplier and to control the third operand to be input to an S bit operand input of the fourth multiplier and the fourth operand to be input to a Q bit operand input of the fourth multiplier.

19. The multiplier of claim 16, wherein the absolute value of one operand of the third and fourth operands is less than $2^S$ and the absolute value of the other operand of the third and fourth operands is equal to or greater than $2^S$,
the control circuit is further configured to disable the first multiplier and controlling the operand that has an absolute value that is less than $2^S$ to be input to an Q bit operand input of the third multiplier and to a Q bit operand input of the fourth multiplier, and to control an S least-significant bits of the operand having an absolute value that is equal to or greater than $2^S$ to an S bit operand input of the fourth multiplier and a R S most-significant bits of the operand having an absolute value that is equal to or greater than $2^{N/2}$ to an R bit operand input of the third multiplier.

20. The multiplier of claim 14, wherein an absolute value of one operand of the third and fourth operands is less than $2^P$ and an absolute value of the other operand of the third and fourth operands is equal to or greater than $2^P$,
the control circuit is further configured to disable the second multiplier and controlling the operand having the absolute value that is less than $2^P$ to be input to a P bit operand input of the first multiplier and the operand having the absolute value that is equal to or greater than $2^P$ to be input to an N bit operand input of the first multiplier.

* * * * *